United States Patent
Zhao et al.

(10) Patent No.: US 9,629,202 B2
(45) Date of Patent: Apr. 18, 2017

(54) IN-DEVICE COEXISTENCE OF MULTIPLE WIRELESS COMMUNICATION TECHNOLOGIES

(71) Applicant: MARVELL WORLD TRADE LTD., St. Michael (BB)

(72) Inventors: Qing Zhao, Milpitas, CA (US); Hui-Ling Lou, Sunnyvale, CA (US); Leilei Song, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 247 days.

(21) Appl. No.: 14/166,609

(22) Filed: Jan. 28, 2014

(65) Prior Publication Data
US 2014/0211766 A1    Jul. 31, 2014

Related U.S. Application Data

(60) Provisional application No. 61/757,954, filed on Jan. 29, 2013.

(51) Int. Cl.
*H04W 88/06* (2009.01)
*H04J 3/00* (2006.01)
*H04W 72/12* (2009.01)

(52) U.S. Cl.
CPC ....... *H04W 88/06* (2013.01); *H04W 72/1215* (2013.01)

(58) Field of Classification Search
CPC  H04W 88/06; H04W 72/1215; H04B 7/2603; H04L 27/2646
USPC .......................................................... 370/336
See application file for complete search history.

(56) References Cited

U.S. PATENT DOCUMENTS

| | | | |
|---|---|---|---|
| 5,471,461 A * | 11/1995 | Engdahl | G05B 19/0421 370/252 |
| 5,710,765 A | 1/1998 | Lee et al. | |
| 6,614,797 B1 | 9/2003 | Hippelainen | |
| 7,215,659 B1 | 5/2007 | Chen et al. | |
| 7,277,692 B1 | 10/2007 | Jones et al. | |
| 7,809,399 B2 | 10/2010 | Lu et al. | |
| 8,094,597 B1 | 1/2012 | Chhabra et al. | |
| 8,155,138 B2 | 4/2012 | van Nee | |
| 8,526,351 B2 | 9/2013 | Fischer et al. | |
| 8,705,427 B1 | 4/2014 | Chhabra et al. | |

(Continued)

OTHER PUBLICATIONS

"Technical White Paper: Long Term Evolution (LTE): A Technical Overview", Motorola, 2007, 15 pages.

(Continued)

*Primary Examiner* — Andrew Chriss
*Assistant Examiner* — Ellen Kirillova

(57) ABSTRACT

In a method of operating a device configured to communicate according to at least a first communication protocol and a second communication protocol, a time division multiplexing (TDM) pattern is obtained. The TDM pattern is defined for communication according to the first communication protocol is obtained. The TDM pattern defines communication periodicity that includes a scheduled period and an unscheduled period. A guard interval is reserved within the unscheduled period, and the unscheduled period is used for communication according to the second communication protocol. The guard interval is used to transition to an inactive state with respect to the second communication protocol.

12 Claims, 9 Drawing Sheets

(56) References Cited

U.S. PATENT DOCUMENTS

| | | | |
|---|---|---|---|
| 8,724,720 B2 | 5/2014 | Srinivasa et al. | |
| 9,119,025 B1 | 8/2015 | Chhabra et al. | |
| 9,420,635 B2 | 8/2016 | Zhao et al. | |
| 2002/0136233 A1 | 9/2002 | Chen et al. | |
| 2002/0181492 A1 | 12/2002 | Kasami et al. | |
| 2003/0093513 A1 | 5/2003 | Hicks et al. | |
| 2005/0059347 A1 | 3/2005 | Haartsen | |
| 2005/0285719 A1* | 12/2005 | Stephens | H04W 74/06 340/10.2 |
| 2006/0252449 A1* | 11/2006 | Ramesh | H04W 52/44 455/522 |
| 2008/0279163 A1 | 11/2008 | Desai | |
| 2009/0059826 A1 | 3/2009 | Zhao et al. | |
| 2009/0196163 A1 | 8/2009 | Du | |
| 2011/0002219 A1 | 1/2011 | Kim et al. | |
| 2012/0164948 A1 | 6/2012 | Narasimha et al. | |
| 2012/0281563 A1* | 11/2012 | Comsa | H04W 24/10 370/252 |
| 2013/0155931 A1 | 6/2013 | Prajapati et al. | |
| 2013/0194985 A1 | 8/2013 | Zetterman et al. | |
| 2013/0286909 A1* | 10/2013 | Panneerselvam | H04W 52/0206 370/311 |
| 2014/0038621 A1 | 2/2014 | Koo et al. | |
| 2014/0198672 A1* | 7/2014 | Koo | H04W 72/1215 370/252 |

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.
3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), Dec. 2011, 125 pages.
3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), Mar. 2012, 125 pages.
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010, 149 pages.
3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.
3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", Dec. 2010, 32 pages.
3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", Dec. 2010, 42 pages.
3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", Dec. 2010, 297 pages.
3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", Dec. 2011, 296 pages.
3GPP TS 23.203 V10.6.0, "3rd Generation Partnership Project; Technical Specification Group Services and System Aspects; Policy and Charging Control Architecture (Release 10)", Mar. 2012, 131 pages.
Yuan et al., "Carrier Aggregation for LTE-Advanced Mobile Communication Systems," IEEE Communications Magazine, pp. 88-93, Feb. 2010.
Wannstrom, "Carrier Aggregation explained," pp. 1-6 May 2012.
Trill: Fine-Grained Labeling, Internet-Draft, Eastlake et al., Dec. 8, 2011, 21 pages.
Pedersen et al., "Carrier Aggregation for LTE-Advanced: Functionality and Performance Aspects," IEEE Communications Magazine, vol. 49, No. 6, pp. 89-95, Jun. 1, 2011.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, 23 pages, Nov. 7, 2001.
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003
IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11

(56) References Cited

OTHER PUBLICATIONS plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jun. 2012.

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Oct. 2012.

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2013.

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jul. 2013.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

Wei Hong et al., "Considering In-Device Coexistence Interference from WiFi Point of View", IEEE 802.11-13/0880-01, Jul. 2013.

3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-DeviceCoexistence (Release 11)", Dec. 2011, 44 pages.

IEEE Std 802.11$_{IM}$ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE P802.11n$_{IM}$/D3.00, "Draft STANDARD for Information Technology-Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

IEEE Std. 802.11n$_{IM}$ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

"Analysis of RRM requirements," Ericsson/ST-Ericsson, document R4-125803, 3GPP TSG-RAN WG4 Meeting #64bis, Santa Rosa, CA, Oct. 8-12, 2012.

"Further discussion on the HARQ process reservation based solution," ZTE, document R2-111912, 3GPP TSG-RAN WG2 Meeting #73bis, Shanghai, China, Apr. 11-15, 2011.

Golmie et al., "Bluetooth and WLAN Coexistence: Challenges and Solutions," IEEE Wireless Comm., vol. 10, No. 6, pp. 22-29, (2003).

"How 802.11 b/g Wireless WLAN and Bluetooth Can Play; Without Standards-Based Solutions, ICs Must Referee Spectrum Rivalry," Philips Electronics, dated Sep. 2005, 5 pages.

Quinnell, "WiFi and Bluetooth Fight for Bandwidth," EDN, dated Aug. 4, 2005, 4 pages.

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

"Text Proposal to 36.816 for TDM Solution," Motorola Mobility, document R2-113243, 3GPP TSG-RAN WG2#74, Barcelona, Spain May 9-13, 2011.

Van Nee et al. "The 802.11 n MIMO-OFDM Standard for Wireless LAN and Beyond," Wireless Personal Communications, vol. 37, pp. 445-453 (Jun. 2006).

"WiFi™ and Bluetooth™ —Interference Issues," HP, dated Jan. 2002, 6 pages.

Wojtiuk, "Bluetooth and WiFi Integration: Solving Co-Existence Challenges," RF Design, dated Oct. 2004, 4 pages.

U.S. Appl. No. 12/260,867, Chhabra et al., "Method and Apparatus for Coexistent WLAN and PAN Communication with Intelligent PAN Slot Suppression," filed Oct. 29, 2008.

Non-Final Office Action for U.S. Appl. No. 12/260,867, mailed Sep. 7, 2011 (12 pages).

(56) References Cited

OTHER PUBLICATIONS

Final Office Action for U.S. Appl. No. 12/260,867 dated Mar. 12, 2012 (20 pages).
Non-Final Office Action for U.S. Appl. No. 12/260,867, mailed Aug. 9, 2012 (20 pages).
Final Office Action for U.S. Appl. No. 12/260,867 dated Mar. 4, 2013 (19 pages).
Non-Final Office Action for U.S. Appl. No. 12/260,867, mailed Jul. 3, 2013 (24 pages).
Final Office Action in U.S. Appl. No. 12/260,867, dated Feb. 3, 2014 (24 ages).
Examiner's Answer to Appeal Brief in U.S. Appl. No. 12/260,867, dated Nov. 5, 2014 (19 pages).
U.S. Appl. No. 12/260,875, Chhabra et al., "Method and Apparatus for Coexistent Wireless and Bluetooth Communication Using Power Save Polling," filed Oct. 29, 2008.
Non-Final Office Action for U.S. Appl. No. 12/260,875, dated Sep. 15, 2011 (12 pages).
Final Office Action for U.S. Appl. No. 12/260,875, dated Mar. 29, 2012 (23 pages).
Non-Final Office Action for U.S. Appl. No. 12/260,875, dated Jun. 4, 2013 (17 pages).
Final Office Action for U.S. Appl. No. 12/260,875, dated Oct. 22, 2013 (20 pages).
Examiner's Answer to Appeal Brief in U.S. Appl. No. 12/260,875, dated Aug. 6, 2014 (18 pages).
U.S. Appl. No. 12/260,995, Chhabra et al., "Method and Apparatus for Using Power Management Mode to Regulate Data Transmission when a Bluetooth Network and a Wireless Local Area Network Coexist," filed Oct. 29, 2008.
Non-Final Office Action for U.S. Appl. No. 12/260,995, dated Sep. 15, 2011 (10 pages).
Final Office Action for U.S. Appl. No. 12/260,995, dated Mar. 1, 2012 (14 pages).
Non-Final Office Action for U.S. Appl. No. 12/260,995, dated Aug. 31, 2012 (30 pages).
Final Office Action for U.S. Appl. No. 12/260,995, dated Mar. 5, 2013 (17 pages).
Non-Final Office Action for U.S. Appl. No. 12/260,995, dated Jul. 3, 2013 (17 pages).
Examiner's Answer to Appeal Brief in U.S. Appl. No. 12/260,995, dated Nov. 4, 2014 (19 pages).
Final Office Action for U.S. Appl. No. 12/260,995, dated Jan. 30, 2014 (19 pages).
Board Decision in U.S. Appl. No. 12/260,995, mailed Aug. 31, 2016 (13 pages).

\* cited by examiner

IN-DEVICE COEXISTENCE OF MULTIPLE WIRELESS COMMUNICATION TECHNOLOGIES

CROSS-REFERENCE TO RELATED APPLICATIONS

This disclosure claims the benefit of U.S. Provisional Patent Application No. 61/757,954, filed Jan. 29, 2013, entitled "Guard-Time-based Solution for LTE/WiFi In-device Coexistence," the disclosures of which is hereby expressly incorporated herein by reference in its entirety.

FIELD OF TECHNOLOGY

The present disclosure relates generally to wireless communications and, more particularly, to techniques for enabling coexistent communications with first and second wireless communication networks.

DESCRIPTION OF THE RELATED ART

Wireless communication networks continue to increase in demand as consumers flock toward mobile computing devices and as manufacturers continue to develop wireless devices with greater capabilities and features. Numerous types of wireless networks and network protocols exist. For example, cellular networks typically operate according to a $3^{rd}$ Partnership Project Long Term Evolution (3GPP LTE) Standard currently under development. Wireless local area networks (WLAN) typically operate according to an Electronics Engineers (IEEE) 802.11 standard wireless protocol, first promulgated in 1999. These protocols include IEEE 802.11a, 802.11b, 802.11g, 802.11n, and 802.11 ac which operate at different spectrum bands and/or different multiplexing or spread spectrum schemes to deliver various bit rates to devices on a wireless network. Any of these IEEE 802.11 networks are often referred to as WiFi networks.

Wireless communication devices often employ multiple communication technologies that co-exist in the communication devices. For example, a communication device may operate in a cellular network according to a cellular network communication protocol, such as a 3GPP LTE communication protocol, and may also operate in a WLAN network according to a WLAN communication protocol, such as the IEEE 802.11n Standard or the IEEE 802.11ac Standard. In some situations, concurrent operation using the different communication protocols can interfere with each other. For example, when WLAN communication systems and 3GPP LTE communication systems coexist in sufficiently close proximity to one another within a communication device, transmissions of one system may interrupt, degrade, or otherwise interfere with transmissions of the other system. For example, when a 3GPP LTE transmitter is located in close proximity to a WLAN receiver, transmit power emanating from the 3GPP LTE transmitter may desensitize and possibly saturate the WLAN receiver such that, during the 3GPP transmission, a data packet being sent to the WLAN receiver by a WLAN access point, for example, either may not be received properly by the WLAN receiver or may even not be received at all. 3GPP LTE Standard defines several time division multiplexing (TDM) schemes to allow for other communication technologies (e.g., WLAN technology, Bluetooth technology, etc.) to co-exist in communication devices without interfering with each other during operation of the communication devices.

SUMMARY OF THE DISCLOSURE

In an embodiment, a method of operating a device configured to communicate according to at least a first communication protocol and a second communication protocol includes obtaining a time division multiplexing (TDM) pattern defined for communication according to the first communication protocol, wherein the TDM pattern defines communication periodicity that includes a scheduled period and an unscheduled period. The method additionally includes reserving a guard interval within the unscheduled period, and using the unscheduled period for communication according to the second communication protocol, including using the guard interval to transition to an inactive state with respect to the second communication protocol.

In other embodiments, the method includes any combination of one or more of the following features.

Reserving the guard interval includes determining a duration of the guard interval.

Determining the duration of the guard interval comprises determining the duration based on one or both of (i) a data rate of communications between the communication device and at least one other communication device and (ii) a mode of operation of the communication device.

Determining the duration based on the mode of operation of the communication device comprises determining the duration based on whether the communication device operates in uplink mode or in downlink mode during the unscheduled period.

Using the guard interval to transition to the inactive state includes transmitting, during the guard interval, a management frame, wherein the management frame prevents, until a next unscheduled period in the TDM pattern, transmissions by one or more other devices operating according to the second communication protocol.

The management frame is a clear to send to self (CTC-to-Self) frame.

The management frame includes an indication of a time duration for which the at least one other devices is to suspend transmissions.

Transmitting the management frame includes setting the time duration to a mathematical sum of (i) a remaining time duration of a current unscheduled period at a time of transmission of the management frame and (ii) a duration of the scheduling period.

Using the guard interval to transition to the inactive state further comprises, prior to transmitting the management frame, determining whether a frame exchange is in progress, and in response to determining that a frame exchange is in progress, completing the frame exchange before transmitting the management frame.

Using the guard interval to transition to the inactive state further comprises monitoring a communication medium for a time of predetermined duration to determine whether the communication medium is available, and in response to determining that the communication medium is available, initiating a frame exchange, and in response to determining that the communication medium is not available, holding off initiation of the frame exchange until a next unscheduled period.

In another embodiment, an apparatus comprises a communication device having a first network interface configured to operate according to a first communication protocol and a second network interface configured to operate according to a second communication protocol. The communication device is configured to obtain a time division multiplexing (TDM) pattern defined for communication according to the first communication protocol, wherein the TDM pattern defines communication periodicity that includes a scheduled period and an unscheduled period. The communication device is additionally configured to reserve a guard interval at the end of the unscheduled period. The communication device is further configured to operate the second network interface during the unscheduled period, and utilize the guard interval to transition to an inactive state with respect to the second communication protocol.

In other embodiments, the apparatus comprises any combination of one or more of the following features.

The communication device is further configured to determine a duration of the guard interval.

The communication device is configured to determine the duration of the guard interval based on one or both of (i) a data rate of communications between the communication device and at least one other communication device and (ii) a mode of operation of the communication device.

The communication device is configured to determine the duration based at least on whether the communication device operates in uplink mode or in downlink mode during the unscheduled interval.

The communication device is further configured to transmit, during the guard interval, a management frame, wherein the management frame prevents, until a next unscheduled period in the TDM pattern, transmissions by one or more other devices operating according to the second communication protocol.

The management frame is a clear to send to self (CTS-to-Self) frame.

The management frame includes an indication of a time duration for which the at least one other devices is to suspend transmissions.

The communication device is configured to set the time duration in the management frame to a mathematical sum of (i) a remaining time duration of the current unscheduled period and (ii) a duration of the scheduling period.

The communication device is further configured to, prior to transmitting the management frame, determine whether a frame exchange is in progress, and in response to determining that a frame exchange is in progress, wait until the frame exchange is completed before transmitting the management frame.

The communication device is further configured to monitor a communication medium for a time of predetermined duration to determine whether the communication medium is available, and in response to determining that the communication medium is available, initiate a frame exchange, and in response to determining that the communication medium is not available, hold off initiation of the frame exchange until a next unscheduled period.

DETAILED DESCRIPTION

Figure 1:
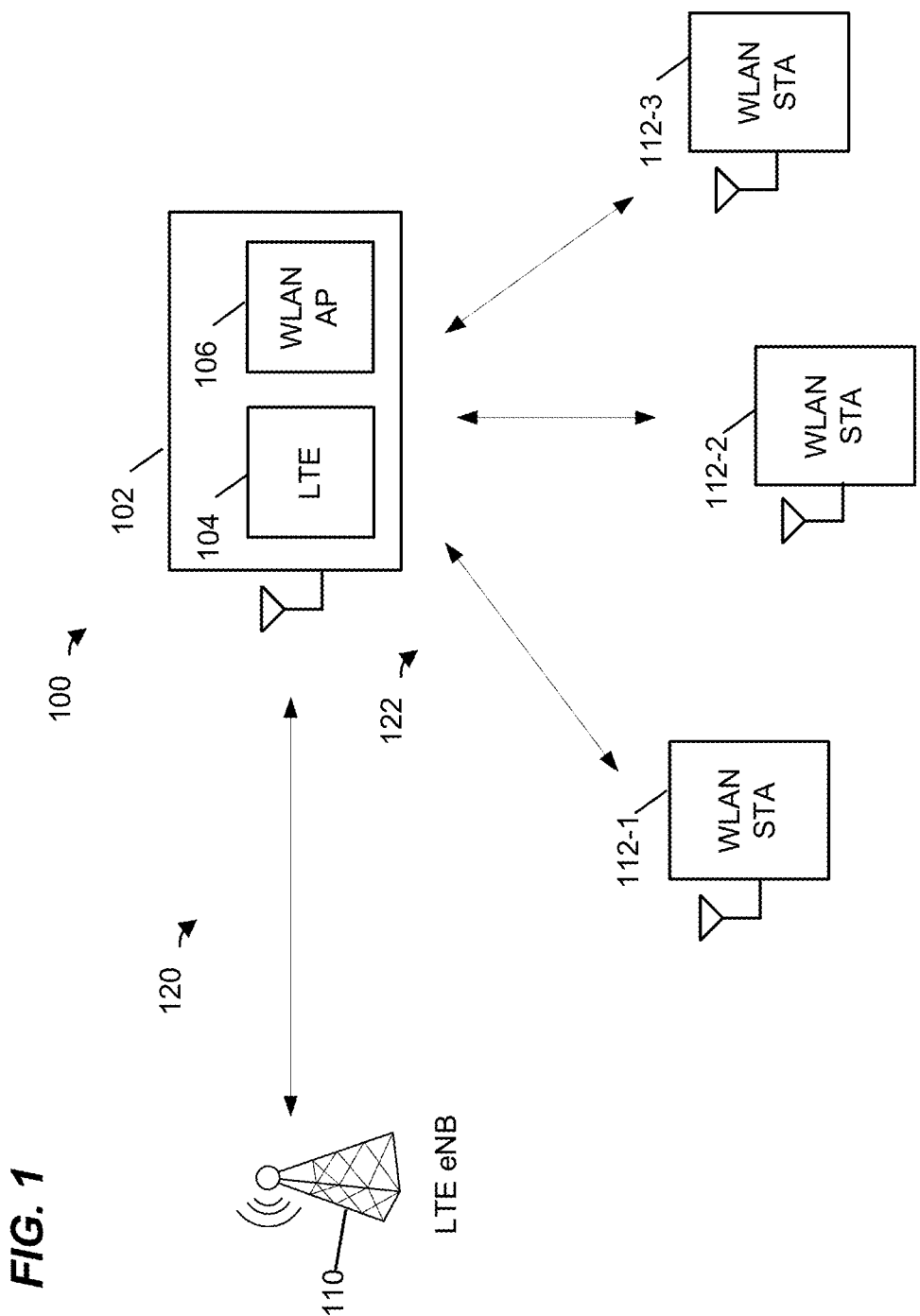
FIG. 1 is a block diagram of a communication network that utilizes in-device interference mitigation techniques of the present disclosure, according to an embodiment.

FIG. 1 is a block diagram of a communication network 100 that utilizes in-device interference mitigation techniques of the present disclosure, according to an embodiment. The communication network 100 includes a wireless communication device 102 configured to operate using at least two different wireless technologies that coexist within the wireless communication device 102, according to an embodiment. The communication device 102 includes a first network interface 104 configured to operate according to at least a first communication protocol and a second network interface 106 configured to operate according to a second communication protocol. In an embodiment, the first communication protocol is a cellular network communication protocol, such as a $3^{rd}$ Generation Partnership Project Long Term Evolution (3GPP LTE) communication protocol, and the second communication protocol is a WiFi communication protocol, such as a wireless local area network (WLAN) communication protocol (e.g., the IEEE 802.11n or the IEEE 802.11ac protocol). In other embodiments, the first communication protocol and/or the second communication protocol is another suitable communication protocol, such as a Worldwide Interoperability for Microwave Access (WiMax) protocol, a Bluetooth protocol, etc.

In an embodiment, the first communication protocol and the second communication protocol define operation in one or more overlapping or closely spaced frequency bands, in an embodiment. Concurrent operation of the first network interface 104 and the second network interface 106 at such frequencies can result in interference between transmission and reception by the first network interface 104 and the second network interface 106 ("in-device interference"), for example when one of the network interfaces 104, 106 is transmitting while the other one of the network interfaces 104, 106 is receiving. As an example, wherein the first communication protocol is a 3GPP LTE communication protocol and the second communication protocol is a WLAN communication protocol, operation of the first network interface in the LTE time-division duplex (TDD) Band 40 (2300 MHz to 2400 MHz) may interfere with concurrent operation of the second network interface in the 2400 MHz-2480 MHz WLAN band. As another example, operation of the first network interface in the LTE TDD Band 41 (2496 MHz to 2690 MHz) may interfere with concurrent operation of the second network interface in the 2400 MHz-2480 MHz WLAN band. As yet another example, uplink transmissions of the first network interface in LTE frequency-division duplex (FDD) Band 7 (2500 MHz to 2700 MHz) may interfere with concurrent operation of the second network interface 106 in the 2400 MHz-2480 MHz WLAN band at least with respect to uplink LTE transmissions, in an embodiment.

In an embodiment, to mitigate or avoid in-device interference, such as in situations in which the first network interface 104 and the second network interface 106 are operating at overlapping or closely spaced frequencies, the communication device 102 utilizes a time division multiplexing (TDM) scheme that restricts transmission and reception according to the first communication protocol to specific different times during operation of the communication device 102. In an embodiment, the TDM scheme is defined by the first communication protocol, and specifies scheduling period and unscheduled period for the communication device 102 with respect to the first communication protocol. The communication device 102 utilizes the scheduling period defined by the TDM scheme to communicate according to the first communication protocol, and utilizes the unscheduled period defined by the TDM scheme to communicate according to the second communication protocol, in an embodiment. In an embodiment, to efficiently and gracefully transition the communication device 102 into an inactive state with respect to the second communication protocol, the communication device 102 reserves a guard interval at the end of the unscheduled period defined by the TDM scheme. The communication device 102 utilizes the guard interval to perform various activities to transition the communication device 102 into an inactive state with respect to the second communication protocol, such as completing frame exchanges being conducted by the second network interface 106, informing other devices that the other devices should hold off transmissions until the next unscheduled period of the TDM scheme, etc.

In the embodiment of FIG. 1, the communication device 102 operates as a mobile access point or a "hotspot" that provides network connectivity to one or several other communication devices that are configured to operate at least according to the second communication protocol. As illustrated in FIG. 1, the communication network 100 includes a base station 110 and a plurality of communication devices 112. In an embodiment, the base station 110 is configured to operate according to the first communication protocol, and is part of a first sub-network 120 that operates according to the first communication protocol (e.g., a 3GPP LTE communication protocol). Using 3GPP LTE terminology, the base station 110 is referred to herein as an "evolved Node B" or "E-UTRAN Node B" (eNB) 110. The communication devices 112 are configured to operate according to at least the second communication protocol, and are part of a second sub-network 122 that operates according to the second communication protocol (e.g., a WLAN communication protocol). The communication device 102 provides network connectivity to the communication devices 112 by operating as a mobile base station or a mobile access point for the communication devices 112. Using WLAN technology, the communication devices 112 are referred herein as client stations (STAs) 112. Although three client stations 112 are illustrated in FIG. 1, the network 100 includes other suitable numbers (e.g., 1, 2, 4, 5, 6, 7, 8, 9, 10, etc.) of client stations 112, in other embodiments. In an embodiment, the first network interface 104 of the communication device 102 receives data from the eNB 110 via the first sub-network 120 on behalf of the devices 112, and relays this data to the second network interface 106. The second network interface 106, in turn, transmits the data to the appropriate STAs 112 via the second sub-network 122.

Figure 2:
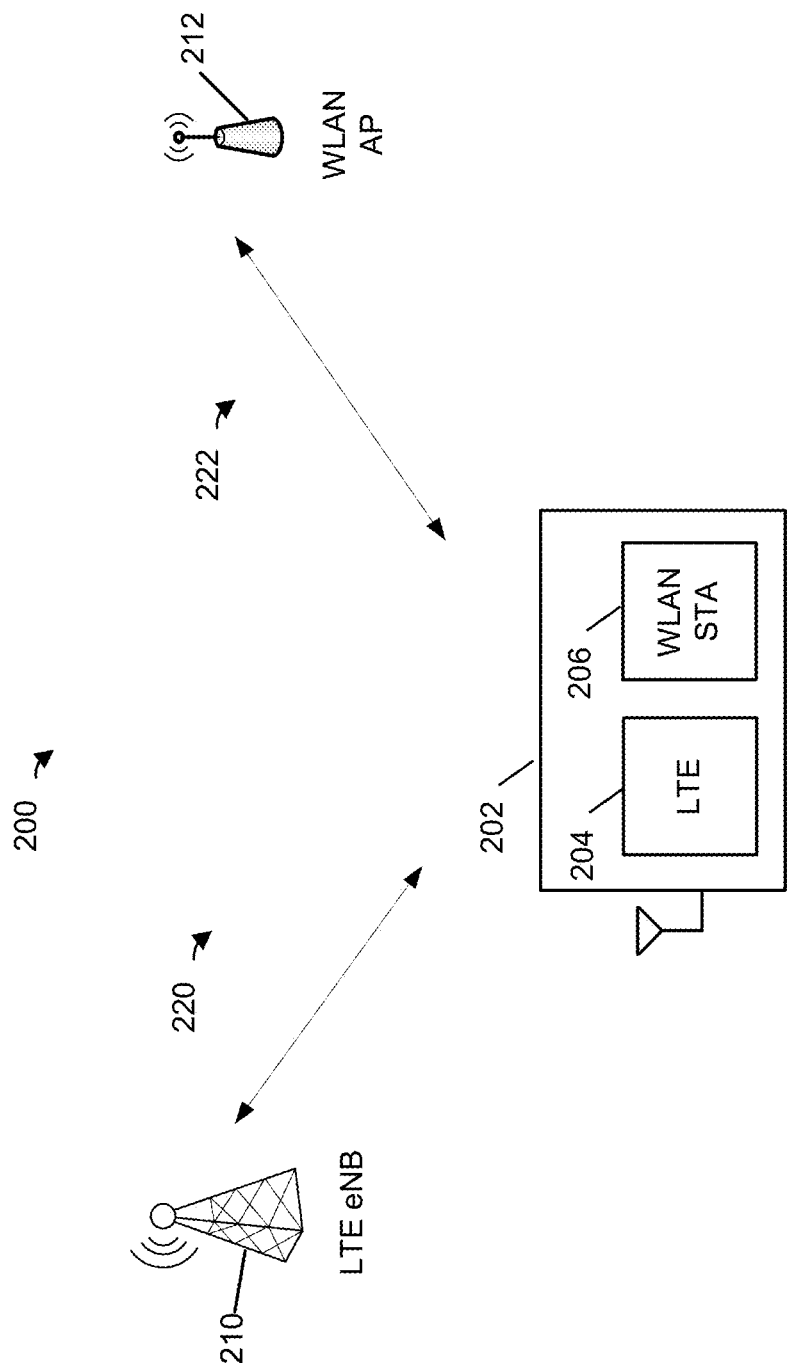
FIG. 2 is a block diagram of a communication network that utilizes in-device interference mitigation techniques of the present disclosure, according to another embodiment.

FIG. 2 is a block diagram of a communication network 200 that utilizes in-device interference mitigation techniques of the present disclosure, according to another embodiment. The communication network 200 includes a wireless communication device 202 which operates according to at least two different wireless technologies that coexist within the wireless communication device 202. The communication device 202 is the same as or similar to the communication device 102 of FIG. 1. The communication device 202 includes a first network interface 204 configured to operate according to a first communication protocol and a second network interface 206 configured to operate according to a second communication protocol. In an embodiment, the first communication protocol is a cellular network communication protocol, such as a 3GPP LTE communication protocol, and the second communication protocol is a WiFi communication protocol, such as a WLAN communication protocol (e.g., the IEEE 802.11n or the IEEE 802.11ac protocol). In other embodiments, the first communication protocol and/or the second communication protocol is another suitable communication protocol, such as a Worldwide Interoperability for Microwave Access (WiMax) protocol, a Bluetooth protocol, etc.

The communication network 200 includes a first base station 210 and a second base station 212. The first base station 210 is configured to operate according to at least the first communication protocol. The first base station 210 is part of a first sub-network 220 that operates according to the first communication protocol (e.g., a 3GPP LTE communication protocol). Using 3GPP LTE terminology, the first base station 210 is referred to herein as an eNB 210. The second base station 212 is configured to operate according to at least the second communication protocol. The second base station 212 is part of a second sub-network 222 that operates according to the second communication protocol (e.g., a WLAN communication protocol). Using WLAN technology, the second base station 212 is referred herein as an access point (AP) 212. The communication device 202 communicates with the eNB 210 via the first sub-network 220, in an embodiment. Additionally, at least some traffic to and/or from the communication device 202 is offloaded from the first network 220 to the second sub-network 222, in an embodiment. The communication device 202 communicates with the AP 212 via the second sub-network 222 to transmit and/or receive traffic offloaded to the second sub-network 222, in an embodiment. The communication device 202 utilizes interference mitigation techniques of the present disclosure to mitigate or avoid interference between the first network interface 204 and the second network interface 206 (e.g., a TDM scheme with guard interval as described above), in various embodiments.

Figure 3:
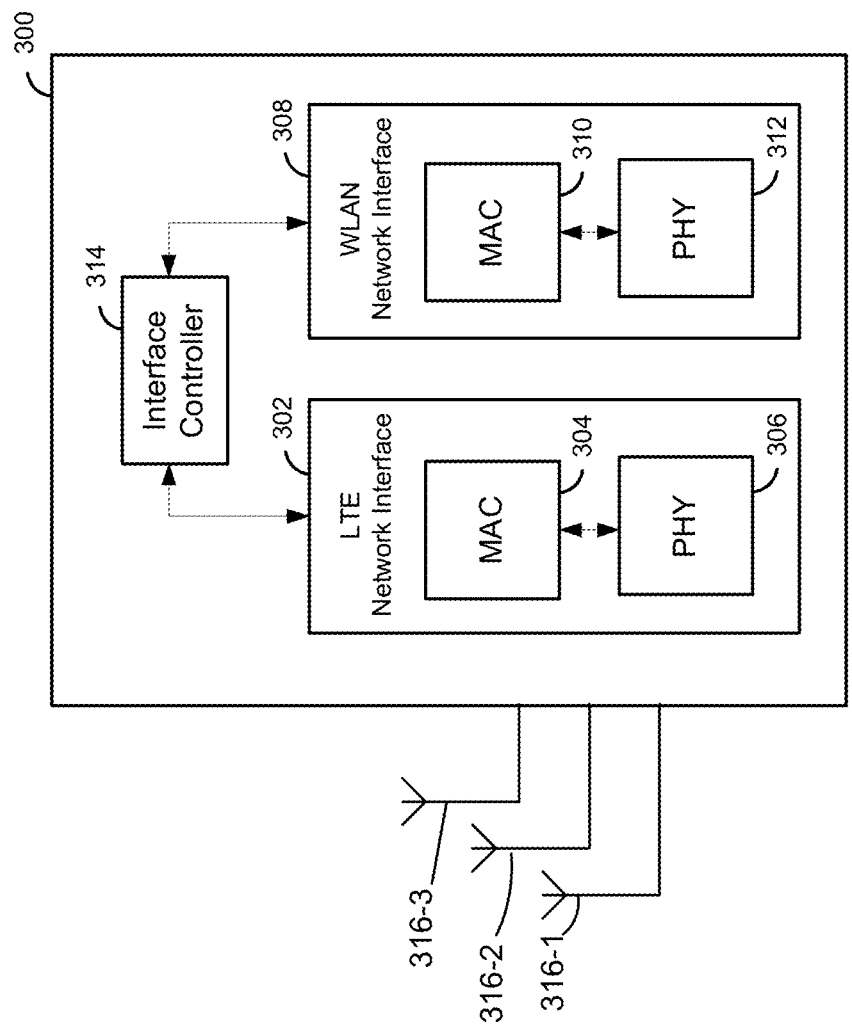
FIG. 3 is a block diagram of an example implementation of a communication device, according to an embodiment.

FIG. 3 is a block diagram of an example implementation of a communication device 300, according to an embodiment. In various embodiments, the communication device 300 is used in any of the network configurations of FIG. 1 or FIG. 2, for example. For example, in an embodiment, the communication device 300 corresponds to the communication device 102 of FIG. 1. In another embodiment, the communication device 300 corresponds to the communication device 202 of FIG. 2. In other embodiments, the communication device 300 is used in networks other than the example networks of FIGS. 1 and 2. Similarly, communication devices other than the communication device 300 are used on the networks of FIGS. 1 and 2 in other embodiments.

The communication device 300 includes a first network interface 302 which, in turn, includes a physical layer (PHY)

processing unit 304 and a medium access control (MAC) processing unit 306. The first network interface 302 is configured to operate according to a first communication protocol. In an embodiment, the first communication protocol is a 3GPP LTE communication protocol. The PHY processing unit 304 is configured to transmit and receive data units configured according to the 3GPP LTE communication protocol, in this embodiment. The MAC processing unit 306 is configured to implement medium access control according to the 3GPP LTE communication protocol, in this embodiment.

The communication device 300 includes a second network interface 308 which, in turn, includes PHY processing unit 310 and a MAC processing unit 312. The second network interface 308 is configured to operate according to a second communication protocol. In an embodiment, the second communication protocol is a WLAN communication protocol. The PHY processing unit 310 is configured to transmit and receive data units configured according to the WLAN communication protocol, in this embodiment. The MAC processing unit 312 is configured to implement medium access control according to the WLAN communication protocol, in this embodiment.

An interface controller 314 is coupled to the first network interface 302 and to the second network interface 308. The interface controller 314 is configured to control operation of the first network interface 302 and the second network interface 308 and to provide interference mitigation between the first network interface 302 and the second network interface 308. Although the interface controller 314 is illustrated in FIG. 3 as being a component separate from the first network interface 302 and the second network interface 308, functionality of the interface controller 314 is at least partially included in the network interface 302 and/or in the network interface 308, in some embodiments.

The communication device 300 includes a plurality of antennas 316. Although three antennas 316 are shown in FIG. 3, the communication device 300 includes other suitable numbers of antennas 316 (e.g., 1, 2, 4, 5, 6, etc.), in other embodiments. Each of the network interfaces 302, 308 is coupled to respective one or more antennas 316, in an embodiment. In another embodiment, one or more antennas 316 are coupled to each one of the network interfaces 302, 308 and are shared by the interfaces 302, 308.

Figure 4:
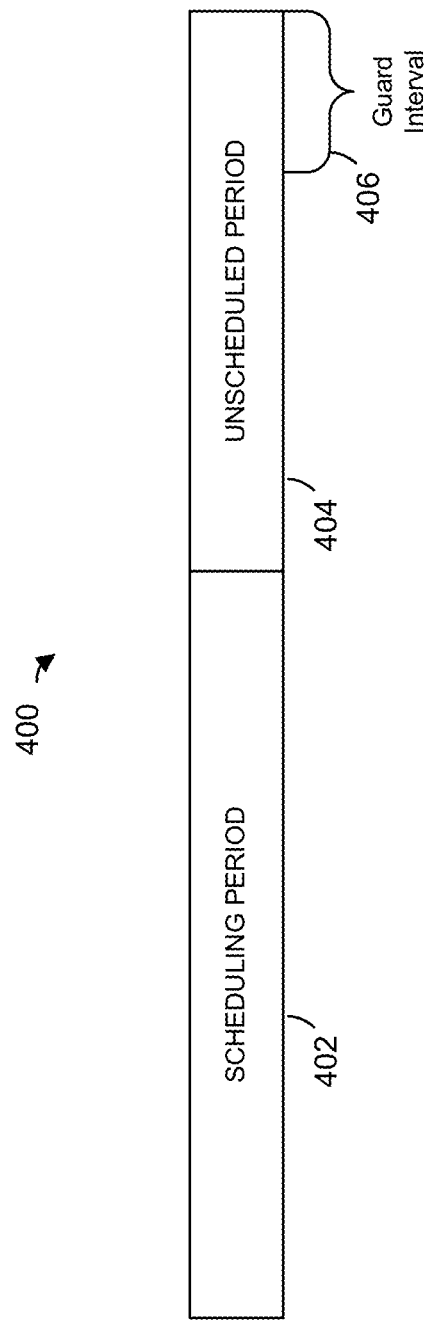
FIG. 4 is a block diagram of a time division multiplexing (TDM) pattern employed by a communication device to operate using multiple wireless communication technologies, according to an embodiment.

FIG. 4 is a block diagram of a time division multiplexing (TDM) pattern 400 employed by a communication device to operate multiple wireless communication technologies within the communication device, according to an embodiment. In an embodiment, the communication device 300 utilizes the TDM pattern 400 to operate the first network interface 302 and the second network interface 308 during different time periods defined by the TDM pattern 400. The TDM pattern 400 is defined by the 3GPP LTE communication protocol, in an embodiment. The communication device 300 receives the TDM pattern 400 from an eNB, such as the eNB 102 of FIG. 1 or the eNB FIG. 2, in an embodiment. In an embodiment, prior to receiving the TDM pattern 400 from the eNB, the communication device 300 provides a desired TDM pattern for the communication device 300 to the eNB. In an embodiment, the communication device 300 determines the desired TDM pattern so as to maximize overall data throughput for the communication device 300. In an embodiment, the eNB receives desired TDM patterns from one or several communication devices operating in a network, and determines an overall schedule for the multiple devices operating in the network based on desired TDM patterns received from the multiple devices.

The TDM pattern 400 defines a scheduling period 402 and an unscheduled period 404. In an embodiment, the TDM pattern 400 is defines as a periodicity of the TDM pattern 400 and a duration of one or both of the scheduling period 402 and the unscheduled period 404. FIG. 4 illustrates one period of the TDM pattern 400. In an embodiment, the unscheduled period 404 is followed by a next scheduling period 402 corresponding to the next period of the TDM pattern 400, which is followed by a next unscheduled period 404 corresponding to the next period of the TDM pattern 400, and so on, in an embodiment.

In an embodiment, the TDM pattern 400 defines a discontinuous reception (DRX) pattern according to which the first network interface 302 transmits/receives during the scheduling period 402 and suspends transmission/reception (e.g., enters a power save mode) during the unscheduled period 404. In another embodiment, the TDM pattern 400 defines a hybrid automatic repeat request (HARQ) process subframe puncturing pattern in which one or more HARQ processes are punctured such that the first network interface 302 is inactive during one or more HARQ process subframes (unscheduled period), for example.

According to an embodiment, the communication device 300 utilizes the scheduling period 402 for communication according to the 3GPP LTE communication protocol, and utilizes the unscheduled period 404 for communication according to the WLAN communication protocol. In an embodiment, the controller 314 of the communication device 300 activates the first network interface 302 at the beginning of the scheduling period 402 and deactivates the first network interface 302, or at least suspends transmissions by the first network interface 302, at the end of the scheduling period 402. Similarly, the controller 314 activates the second network interface 308 t at the beginning of the unscheduled period 404 and deactivates the second network interface 308, or at least suspends transmissions by the first network interface 308, at the end of the unscheduled period 404, in an embodiment.

In an embodiment, the controller 314 reserves a guard interval 406 at the end of the unscheduled period 404. The communication device 300 utilizes the guard interval 406 to transition into an inactive state of the communication device 300 with respect to the second communication protocol (e.g., inactive state of the second network interface 308), in an embodiment. For example, the network interface 308 of the communication device 300 utilizes the guard interval 406 to ensure that all current frame exchanges between the communication device 300 and other devices in communication with the communication device 300 are completed before the end of the unscheduled period 404, in an embodiment. Additionally, if necessary (e.g., when the network interface 308 is operating as a mobile base station, such as a mobile AP), the network interface 308 utilizes the guard interval 406 to ensure that other devices in the WLAN network do not attempt to communicate with the communication device 300 during the time that the network interface 308 is inactive (i.e., during the scheduling period 402). For example, the network interface 308 transmits, during the guard interval 406, a management frame that informs other WLAN devices in the vicinity of the communication device 300 that the other devices should hold off transmissions for a certain period of time, such as until the beginning of the next unscheduled period 404 of the TDM pattern 300. On the other hand, when the second network interface 308 operates as a WLAN client station (e.g., in a cellular offloading configuration), then the network interface need not transmit such a management frame during the guard interval. Instead, the controller 314 instructs the MAC processing unit 310 of the network interface 308 to hold off transmissions until the next unscheduled period 404 of the TDM pattern 400, in an embodiment.

In an embodiment, the controller 314 determines a length of the guard interval 406 to efficiently utilize the unscheduled period 404 for communication according to the second communication protocol while ensuring that the guard interval 406 is sufficiently long to allow the communication device 300 to perform necessary activities to transition into the inactive state with respect to the second communication protocol. In an embodiment, the controller 314 determines the length of the guard interval 406 based on the data rate at which the network interface 308 is communicating during the current unscheduled interval 404. The controller 314 adjusts the length of the guard interval 406 if the network interface 308 switches to a new data rate during the current unscheduled interval 404, in some embodiments. Alternatively, the controller 314 does not adjust the length of the guard interval even if the communication device 300 switches to a new data rate during the current unscheduled interval 404, or adjust the length of the guard interval only if the communication device 300 switches to a lower data rate during the current unscheduled interval 404.

In addition to or instead of determining the length of the guard interval 406 based on the data rate, the controller 314 determines the length of the guard interval 406 based on mode of operation of the network interface 308 during operation of the network interface 308 (e.g., during the current unscheduled interval 304), in some embodiments. For example, the length of the guard interval 406 depends on whether the network interface 308 operates in a first mode or in a second mode during the current unscheduled interval 404. For example, the length of the guard interval 406 depends on whether the network interface 308 operates as a WLAN AP or operates as a WLAN STA, in such embodiments. As an example, the length of the guard interval 406 depends on whether the network interface 308 of the communication device 300 is operating in an uplink mode, in which data is transmitted from an STA to an AP, or in downlink mode, in which data is transmitted from an AP to an STA, in an embodiment. In an embodiment, the controller 314 adjusts the length of the guard interval 406 if the communication device 300 switches from the first mode to the second mode, or vise versa, during operation of the current unscheduled interval 404. The controller 314 does not adjust the length of the guard interval during the current unscheduled interval 404 even if the communication device 300 switches from the first mode to the second mode, or vise versa, in another embodiment. For example, the controller 314 sets the length of the guard interval to the longer one of the guard interval length determined based on the first mode and the second mode, and does not adjust the guard interval length even if the communication device 300 switches from the first mode to the second mode, or vise versa, during the current unscheduled interval 404, in an embodiment.

In an embodiment, duration of the unscheduled period 404 is 60 ms. In other embodiments, the unscheduled period 404 is of other suitable durations. For a network in which longest transmission time for a data frame is 5.5 ms, the guard interval 406 is less than or equal to 7 ms in a typical configuration, in an embodiment. Accordingly, the length of the guard interval 406 determined according to techniques of the present disclosure typically introduces less than 15% of overhead in the worst case scenario (e.g., the longest data transmissions), in various embodiments.

Figure 5:
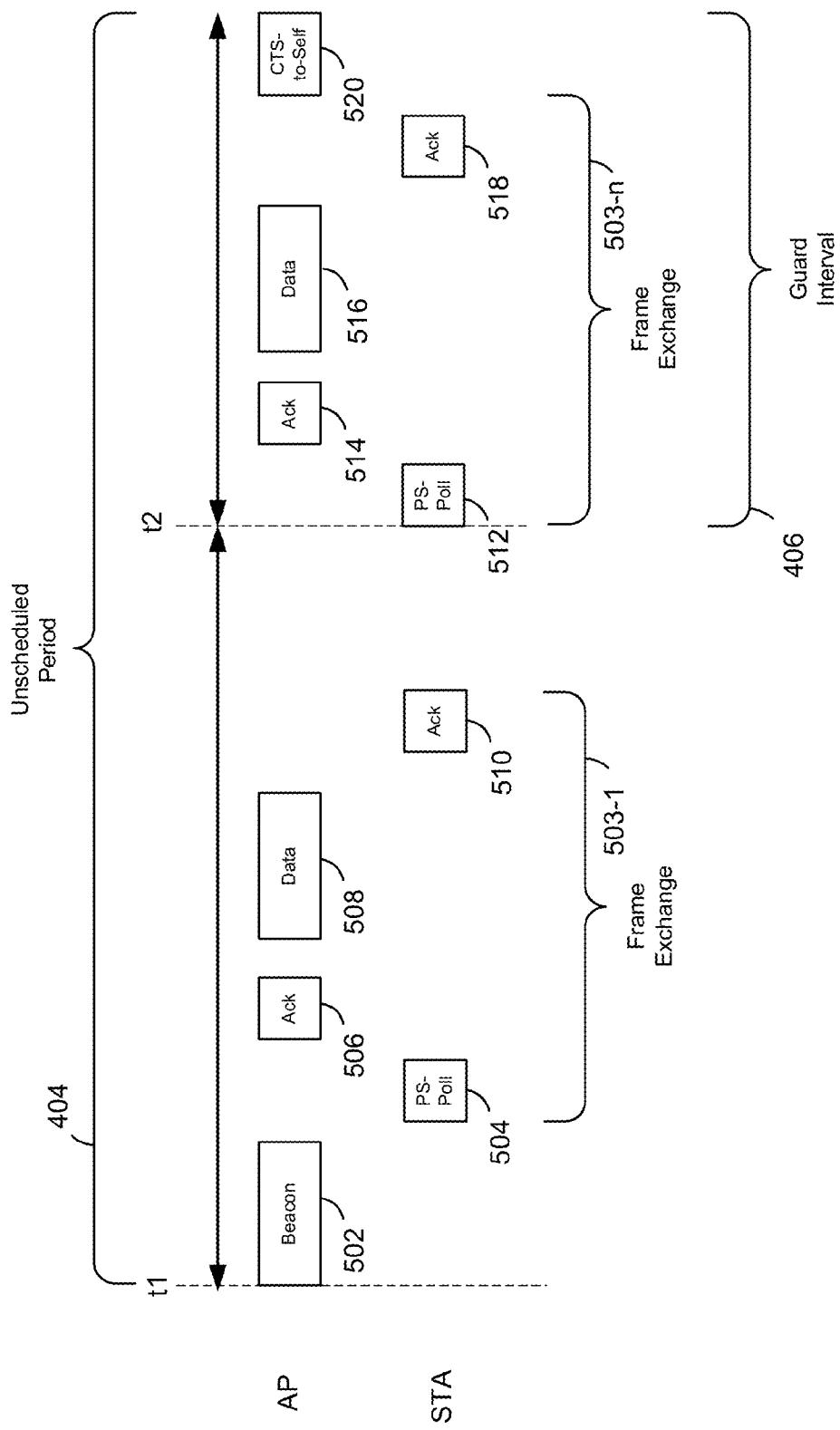
FIG. 5 is a diagram of a frame exchange conducted during an unscheduled period of a TDM pattern in an example scenario, according to an embodiment.

FIG. 5 is a diagram of a frame exchange 500 conducted during the unscheduled period 404 of the TDM pattern 400 in an example scenario, according to an embodiment. In the scenario of FIG. 5, the communication device 300 operates as a WLAN AP, such as in the case of the communication device 102 of FIG. 1, and is operating in downlink mode. For example, with reference to FIG. 1, the communication device 200 transmits data to a client station 112 (e.g., to the station 112-1), in an example scenario illustrated in FIG. 5. For ease of explanation, the frame exchange 500 is described below is being conducted between the communication device 300 and the client station 112-1 of FIG. 1.

As illustrated in FIG. 5, at the start of the unscheduled period 404, the communication device 300 (indicated in FIG. 5 as "AP") transmits a beacon frame 502. The beacon frame 502 informs the client station 112-1 that the AP has data to be transmitted to the station 112-1. The client station 112-1 (indicated in FIG. 5 as "STA") receives the beacon frame 502, and initiates a frame exchange 503-1 between the client station 112-1 and the communication device 300 by transmitting a PS-Poll frame 504 to the communication device 300 to indicate to the communication device 300 that the client station 112-1 is ready to receive the data. In response to receiving the PS-poll frame 504, the communication device 300 sends an acknowledgement frame 506 to the station 112-1 and then transmits a data frame 508 to the client station 112-1. The client station 112-1 receives the data frame 506 and transmits an acknowledgement frame 508 back to the communication device 300. The acknowledgement frame 508 completes the frame exchange 503, in an embodiment. If additional data to be transmitted to the client station 112-1 is available at the communication device 300, the communication device 300 initiates one or more additional frame exchanges during the unscheduled period 404 to transmit additional data to the client station 112-1, in an embodiment.

Guard interval 406 of the unscheduled period 404 begins at a time t2. In an embodiment, at the time t2, the communication device 300 initiates a medium sensing procedure (e.g. a carrier sensing procedure) to determine whether the medium is currently free. In an embodiment, the communication device 300 conducts the medium sensing procedure for a certain period of time, such as for a duration of a DIFS. If no transmissions are detected in the medium, the communication device 300 clears the medium. For example, the communication device 300 transmits a management frame, such as a CTS-to-Self frame to clear the medium. On the other hand, if a transmission is detected by the medium sensing procedure indicating a current frame exchange in the medium, the communication device 300 waits until completion of the frame exchange before transmitting the management frame. In the example scenario of FIG. 5, the client station 112-1 initiates a frame exchange 503-n by transmitting a PS-poll frame 512 at the time t2. The communication device 300 detects transmission of the PS-poll frame 512 and holds off transmission of a management frame. Upon reception of the PS-poll frame 512, the communication device 300 transmits an acknowledgement frame 514 followed by a data frame 516. The acknowledgement frame 614 completes the frame exchange 603-n. Then, the communication device 300 transmits a CTS-to-Self frame 616 to clear the medium from WLAN transmissions until the next unscheduled period 404. The client station 112-1 receives the data frame 516 and responds with an acknowledgement frame 518. The acknowledgement frame 518 completes the frame exchange 503-n. In an embodiment, after completion of the frame exchange 503-n, the communication device 300 transmits a CTC-to-Self frame 520 that informs other devices in the vicinity of the communication device 300 that the other devices should hold off communications transmissions for a certain period of time.

In another example scenario, a frame exchange is in progress at the time t2. In this example scenario, the frame exchange is completed during the guard interval 406, and no new frame exchange is initiated during the guard interval 406, in an embodiment. In this case, the communication device 300 transmits the management frame after completion of the on-going frame exchange.

In an embodiment, the management frame indicates a non-transmission time duration for which the other device should hold off communications with the communication device 300. In an embodiment, the non-transmission time duration indicated in the management frame corresponds to a mathematical sum of the remaining time in the guard interval 406 at the time of transmission of the management frame and a duration of the scheduling period 402 of the TDM pattern 400.

In an embodiment, the time t2 is determined according to:

$$t2 = t1 + \text{unscheduled period duration} - \text{guard interval length} \quad \text{Equ. 1}$$

wherein the unscheduled period duration corresponds to duration of the unscheduled period 406, and the guard interval length is determined according to:

$$\text{Guard Length} = \text{PS-poll} + \text{maxData} + 2*\text{ACK} + \text{CTC-to-self} + 5*\text{SIFS/DIFS} \quad \text{Equ. 2}$$

In Equation 2, PS-poll corresponds to a duration of a PS-poll frame, maxData corresponds to a maximum data frame duration, Ack corresponds to a duration of an acknowledgement frame, CTC-to-Self corresponds to a duration of the CTC-to-Self frame, and SIFS and DIFS correspond to a duration of a short inter-frame spacing and a duration of a distributed function inter-frame spacing, respectively. The maximum data frame duration is determined based on a data rate being utilized by the communication device 300, in an embodiment.

Figure 6:
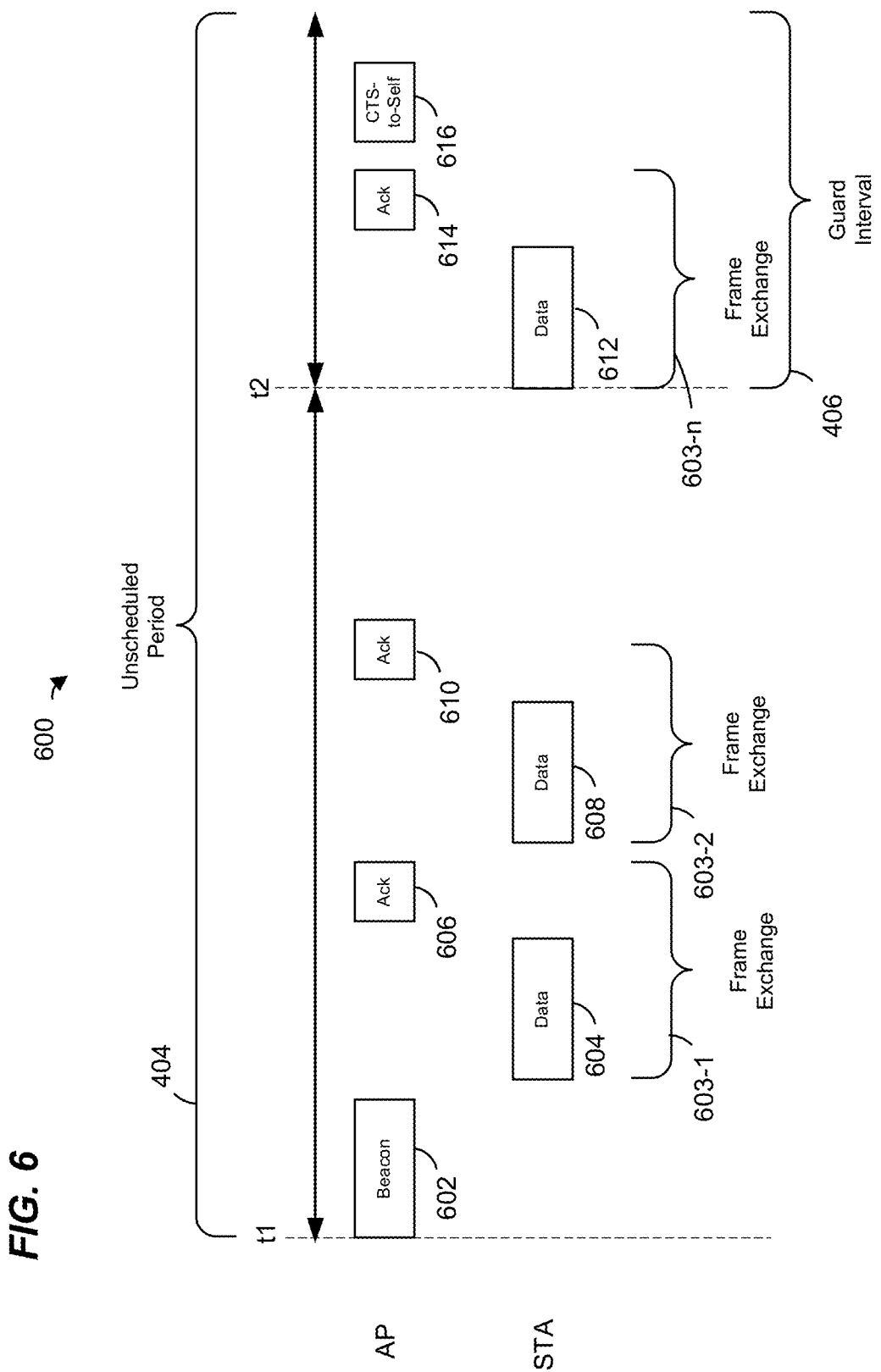
FIG. 6 is a diagram of a frame exchange conducted during an unscheduled period of a TDM pattern in another example scenario, according to an embodiment.

FIG. 6 is a diagram of a frame exchange 600 conducted during the unscheduled period 404 of the TDM pattern 400 in another example scenario, according to an embodiment. In the scenario of FIG. 6, the communication device 300 operates as a WLAN AP, such as in the case of the communication device 102 of FIG. 1, and is operating in uplink mode. For example, with reference to FIG. 1, in an embodiment, a client station 112 (e.g., the client station 112-1) transmits data to the communication device 300, in the example scenario illustrated in FIG. 6. For ease of explanation, the frame exchange 600 is described below is being conducted between the communication device 300 and the client station 112-1 of FIG. 1.

As illustrated in FIG. 6, the unscheduled period 404 begins at a t1. In an embodiment, at the start of the unscheduled period 404 (at t1), the communication device 300 (indicated in FIG. 6 as "AP") transmits a beacon frame 602. The beacon frame 602 informs the client station 112-1 that the AP does not have data to be transmitted to the station 112-1. The client station 112-1 (indicated in FIG. 5 as "STA"), on the other hand, has data to be transmitted to the AP, in this example scenario. Upon receives the beacon frame 602, the client station 112-1 initiates a frame exchange 603 between the client station 112-1 and the communication device 300 by transmitting a data frame 604 to the communication device 300. The communication device 300 receives the data frame 604 and transmits an acknowledgement frame 606 back to the client station 112-1. The acknowledgement frame 606 completes the frame exchange 603, in an embodiment. If the client station 112-1 has additional data to be transmitted to the communication device 300, the client station 112-1 initiates one or more additional frame exchanges during the unscheduled period 404, in an embodiment. For example, after completion of the frame exchange 603, the client station 112-1 initiates a frame exchange 607 by transmitting a data frame 608 to the communication device 300. The communication device 300 receives the data frame 608 and responds with an acknowledgement frame 610, in an embodiment.

Guard interval 406 of the unscheduled period 404 begins at a time t2. In an embodiment, at the time t2, the communication device 300 initiates a medium sensing procedure (e.g. a carrier sensing procedure) to determine whether the medium is currently free. In an embodiment, the communication device 300 conducts the medium sensing procedure for a certain period of time, such as for a duration of a DIFS. If no transmissions are detected in the medium, the communication device 300 clears the medium. For example, the communication device 300 transmits a management frame, such as a CTS-to-Self frame to clear the medium. On the other hand, if a transmission is detected by the medium sensing procedure indicating a current frame exchange in the medium, the communication device 300 waits until completion of the frame exchange before transmitting the management frame. In the example scenario of FIG. 6, the client station 112-1 initiates a frame exchange 603-*n* by transmitting a data frame 612 at the time t2. The communication device 300 detects transmission of the data frame 612 and holds off transmission of a clear medium frame. Upon reception of the data frame 612, the communication device 300 transmits an acknowledgement frame 614. The acknowledgement frame 614 completes the frame exchange 603-*n*. Then, the communication device 300 transmits a CTS-to-Self frame 616 to clear the medium from WLAN transmissions until the next unscheduled period 404.

In an embodiment, the management frame indicates a non-transmission time duration for which the other device should hold off communications with the communication device 300. In an embodiment, the non-transmission time duration indicated in the management frame corresponds to a mathematical sum of the remaining time in the guard interval 406 at the time of transmission of the management frame and a duration of the scheduling period 402 of the TDM pattern 400.

In an embodiment, the time t2 is determined according to Equation 1. In an embodiment, the guard interval length for the scenario illustrated in FIG. 6 (MiFi configuration, uplink transmission) is determined according to:

$$\text{Guard Length} = \text{maxData} + \text{ACK} + \text{CTC-to-self} + 3*\text{SIFS/DIFS} \quad \text{Equ. 3}$$

In Equation 3, maxData corresponds to a maximum data frame duration, Ack corresponds to a duration of an acknowledgement frame, CTC-to-Self corresponds to a duration of the CTC-to-Self frame, and SIFS and DIFS correspond to a duration of a short inter-frame spacing and a duration of a distributed function inter-frame spacing, respectively. The maximum data frame duration is determined based on a data rate being utilized by the communication device 300, in an embodiment.

Figure 7:
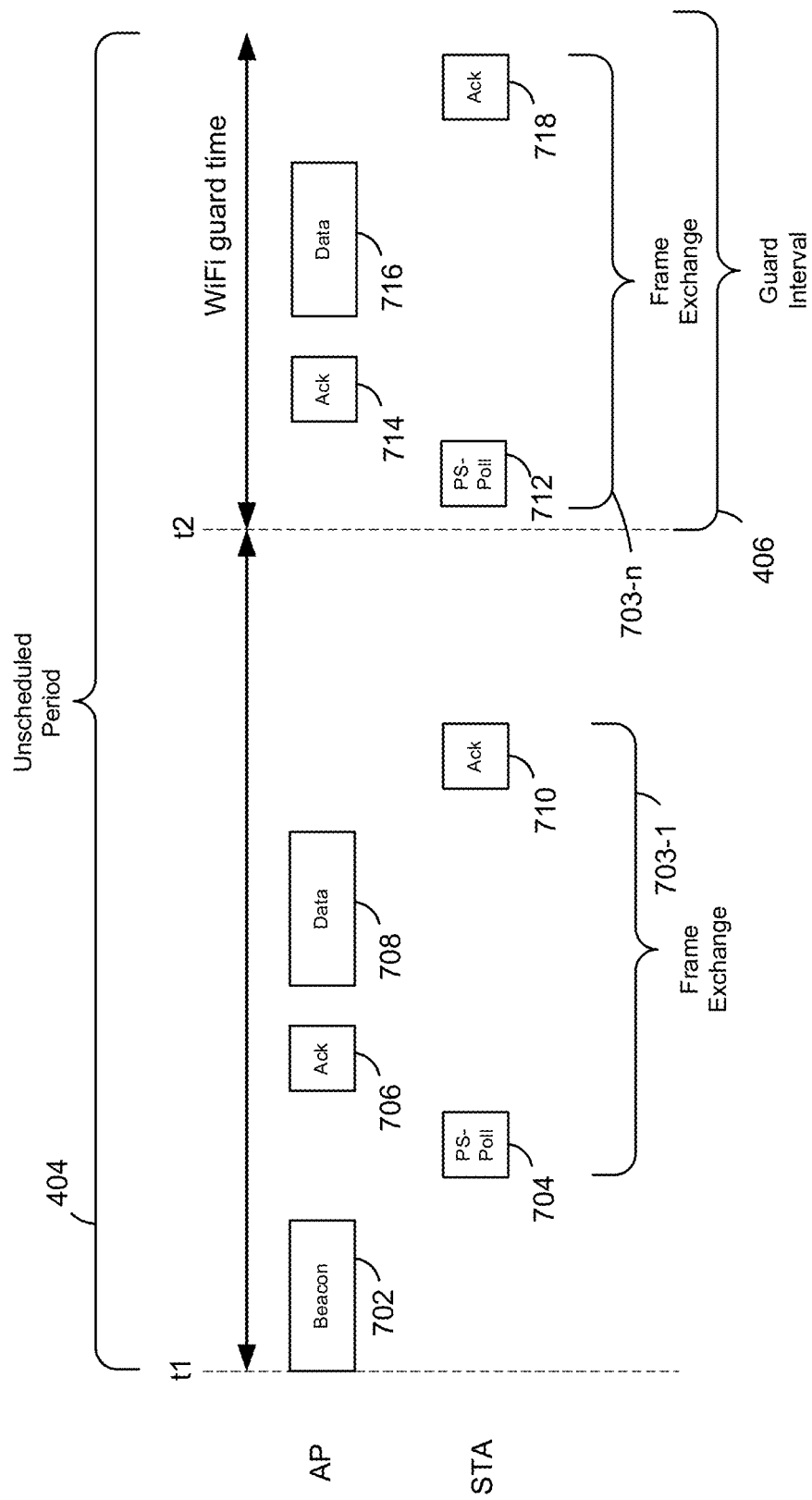
FIG. 7 is a diagram of a frame exchange conducted during an unscheduled period of a TDM pattern in another example scenario, according to an embodiment.

FIG. 7 is a diagram of a frame exchange 700 conducted during the unscheduled period 404 of the TDM pattern 400 in another example scenario, according to an embodiment. In the scenario of FIG. 7, the communication device 300 operates as a WLAN client station, such as in the case of the communication device 202 of FIG. 2, and is operating in downlink mode. For example, with reference to FIG. 2, in an embodiment, the communication device 300 receives data from the AP 212 during the unscheduled period 404, in the example scenario illustrated in FIG. 7. For ease of explanation, the frame exchange 700 is described below is being conducted between the communication device 300 and the AP 212 of FIG. 2.

As illustrated in FIG. 7, the unscheduled period 404 begins at a t1. In an embodiment, at the start of the unscheduled period 404 (at t1), the AP 212 (indicated in FIG. 7 as "AP") transmits a beacon frame 702. The beacon frame 702 informs communication device 300 that that the AP 212 has data to be transmitted to the communication device 300. The communication device 300 (indicated in FIG. 5 as "STA") receives the beacon frame 702 and initiates a frame exchange 703-1 between the communication device 300 and the AP 212 by sending a PS-Poll frame 704 to the AP 212. In an embodiment, the PS-Poll frame 704 indicates to the AP 212 that the communication device 300 is ready to receive the data from the AP 212. In response to receiving the PS-poll frame 704, the AP 212 sends an acknowledgement frame 706 to the communication device 300 and then transmits a data frame 706 to the communication device 300. The communication device 300 receives the data frame 706 from the AP 212 and transmits an acknowledgement frame 708 back to the AP 212. The acknowledgement frame 708 completes the frame exchange 703-1, in an embodiment. If additional data to be transmitted to the communication device 300 is available at the AP 212, the communication device 300 initiates one or more additional frame exchanges during the unscheduled period 404 to receive additional data from the AP 212, in an embodiment.

Guard interval 406 of the unscheduled period 404 begins at a time t2. The communication device 300 initiates a medium sensing (e.g., carrier sensing) procedure at the time t2, in an embodiment. The communication device 300 conducts the medium sensing procedure for a certain period of time, such as for a duration of a DIFS, in an embodiment. In the embodiment of FIG. 7, no transmissions are sensed in the medium during the medium sensing procedure, and the communication device 300 initiates a new frame exchange 703-n by transmitting a PS-Poll frame 712. The AP 212 receives the PS-Poll frame 712 and responds with an acknowledgement frame 714 followed by a data frame 716. The communication device 300 receives the data frame 716 and responds with an acknowledgement frame 718. The acknowledgement frame 718 completes the frame exchange 703-n. After completion of the frame exchange 703-n, the communication device 300 holds off further transmissions until the next unscheduled interval 404, in an embodiment. For example, the controller 314 instructs the MAC processing unit 310 to hold off further transmissions, in an embodiment. In an embodiment, the controller 314 indicates to the MAC processing unit a duration of time for which the MAC processing unit 310 should hold off further transmissions, wherein the duration of time corresponds to a mathematical sum of the remaining time in the current unscheduled period 404 at the time the instruction is sent to the MAC processing unit 310 and the duration of the scheduling period 402. In another embodiment, the controller 314 does not indicate to the MAC processing unit 310 a duration of time for which the MAC processing unit 308 should hold off further transmissions. Instead, the controller 314 sends a signal to the MAC processing unit 310 at the start of the next unscheduled period 406 indicating to the MAC processing unit 310 that the MAC processing unit 310 can now resume transmissions.

In an embodiment, the time t2 is determined according to Equation 1. In an embodiment, the guard interval length for the scenario illustrated in FIG. 7 (cellular offloading configuration, downlink transmission) is determined according to:

$$\text{Guard Length} = \text{PS-Poll} + \text{maxData} + 2*\text{ACK} + 5*\text{SIFS}/\text{DIFS} \qquad \text{Equ. 4}$$

In Equation 4, PS-poll corresponds to a duration of a PS-poll frame, maxData corresponds to a maximum data frame duration, Ack corresponds to a duration of an acknowledgement frame, CTC-to-Self corresponds to a duration of the CTC-to-Self frame, and SIFS and DIFS correspond to a duration of a short inter-frame spacing and a duration of a distributed function inter-frame spacing, respectively. The maximum data frame duration is determined based on a data rate being utilized by the communication device 300, in an embodiment.

Figure 8:
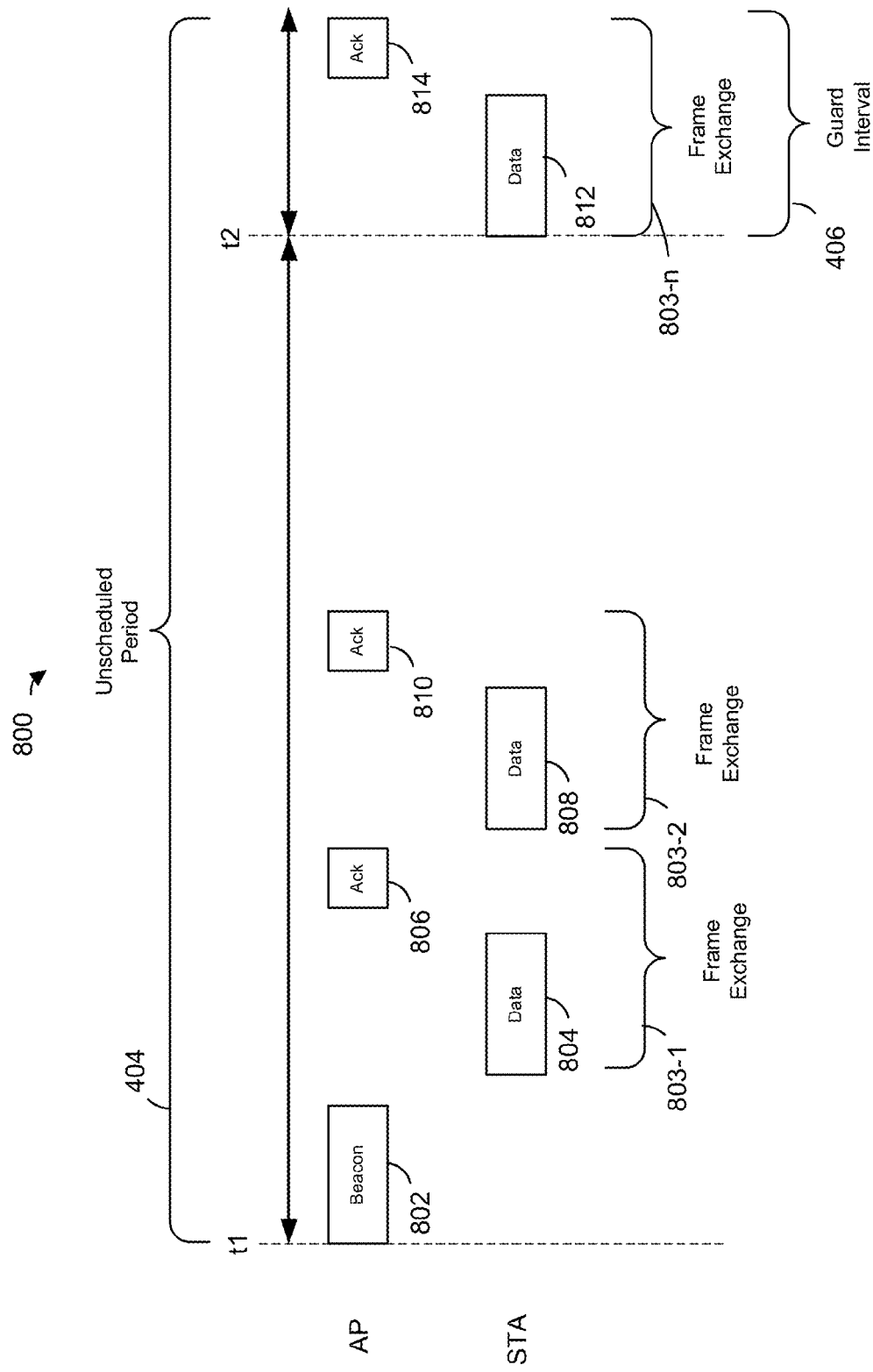
FIG. 8 is a diagram of a frame exchange conducted during an unscheduled period of a TDM pattern in another example scenario, according to an embodiment.

FIG. 8 is a diagram of a frame exchange 800 conducted during the unscheduled period 404 of the TDM pattern 400 in another example scenario, according to an embodiment. In the scenario of FIG. 8, the communication device 300 operates as a WLAN client station, such as in the case of the communication device 202 of FIG. 2, and is operating in uplink mode. For example, with reference to FIG. 2, in an embodiment, the communication device 300 transmits data to the AP 212 during the unscheduled period 404, in the example scenario illustrated in FIG. 7. For ease of explanation, the frame exchange 700 is described below is being conducted between the communication device 300 and the AP 212 of FIG. 2.

As illustrated in FIG. 8, the unscheduled period 404 begins at a t1. In an embodiment, at the start of the unscheduled period 404 (at t1), the AP 212 (indicated in FIG. 8 as "AP") transmits a beacon frame 802. The beacon frame 802 informs the communication device 300 that the AP 212 does not have data to be transmitted to the communication device 300. The communication device 200 (indicated in FIG. 5 as "STA"), on the other hand, has data to be transmitted to the AP 212, in the illustrated embodiment and scenario. Upon receives the beacon frame 802, the communication device 300 initiates a frame exchange 803 between the communication device 300 and the AP 212 by transmitting a data frame 804 to the AP 212. The AP 212 receives the data frame 804 and transmits an acknowledgement frame 806 back to the communication device 300. The acknowledgement frame 806 completes the frame exchange 803-1, in an embodiment. If communication device 300 has additional data to be transmitted to the AP 212, the communication device 300 initiates one or more additional frame exchanges during the unscheduled period 404, in an embodiment. For example, in the illustrated embodiment and scenario, after completion of the frame exchange 803-1, the client station 112-1 initiates a frame exchange 803-2 by transmitting a data frame 808 to the communication device 300. The communication device 300 receives the data frame 808 and responds with an acknowledgement frame 810, in an embodiment.

Guard interval 406 of the unscheduled period 404 begins at a time t2. The communication device 300 initiates a medium sensing (e.g., carrier sensing) procedure at the time t2, in an embodiment. The communication device 300 conducts the medium sensing procedure for a certain period of time, such as for a duration of a DIFS, in an embodiment.

In the embodiment of FIG. 8, no transmissions are sensed in the medium during the medium sensing procedure, and the communication device 300 initiates a new frame exchange 803-$n$ by transmitting a data frame 812 to the AP 212. The AP 212 receives the data frame 812 and responds with an acknowledgement frame 814. The acknowledgement frame 814 completes the frame exchange 803-$n$. After completion of the frame exchange 803-$n$, the communication device 300 holds off further transmissions until the next unscheduled interval 404, in an embodiment. For example, the controller 314 instructs the MAC processing unit 310 to hold off further transmissions, in an embodiment. In an embodiment, the controller 314 indicates to the MAC processing unit a duration of time for which the MAC processing unit 310 should hold off further transmissions, wherein the duration of time corresponds to a mathematical sum of the remaining time in the current unscheduled period 404 at the time the instruction is sent to the MAC processing unit 310 and the duration of the scheduling period 402. In another embodiment, the controller 314 does not indicate to the MAC processing unit 310 a duration of time for which the MAC processing unit 308 should hold off further transmissions. Instead, the controller 314 sends a signal to the MAC processing unit 310 at the start of the next unscheduled period 406 indicating to the MAC processing unit 310 that the MAC processing unit 310 can now resume transmissions.

In another embodiment, prior to initiating any frame exchange with the AP 212, the communication device 300 determines whether the remaining time in the unscheduled period 404 is sufficient for completion of the frame exchange. If the communication device 300 determines that the remaining time in the unscheduled period 404 is sufficient, then the communication device 300 initiates the frame exchange. On the other hand, if the communication device 300 determines that the remaining time is not sufficient for completion of the frame exchange (e.g., during the guard interval 406), then the communication device 300 holds off initiation of the frame exchange. For example, the commutation device 300 attempts to initiate the frame exchange during the next unscheduled period 404, in an embodiment.

In an embodiment, the time t2 in FIG. 8 is determined according to Equation 1. In an embodiment, the guard interval length for the scenario illustrated in FIG. 8 (cellular offloading configuration, uplink transmission) is determined according to:

$$\text{Guard Length}=\text{maxData}+\text{ACK}+2*\text{SIFS}/\text{DIFS} \qquad \text{Equ. 6}$$

In Equation 4, maxData corresponds to a maximum data frame duration, Ack corresponds to a duration of an acknowledgement frame, and SIFS and DIFS correspond to a duration of a short inter-frame spacing and a duration of a distributed function inter-frame spacing, respectively. The maximum data frame duration is determined based on a data rate being utilized by the communication device 300, in an embodiment.

In each of embodiments described above with respect to FIGS. 5-8, the beginning of the unscheduled period 404 coincides with transmission of a beacon frame. Transmission of a beacon frame at, or close to, the beginning of the unscheduled period 404 generally maximizes throughput during the unscheduled period 404, in an embodiment. In some embodiments, the TDM pattern 400 is defined such that the unscheduled period 404 coincides or almost coincides with a beacon interval being utilized in the WLAN network (e.g., the sub-network 122 of FIG. 1 or the sub-network 222 of FIG. 2) in which the device 300 operates.

For example, the suggested TDM pattern sent by the communication device 300 to an eNB is defined such that the beginning of the unscheduled period of the suggested pattern coincides or almost coincides with the beacon interval being utilized in the WLAN network, in an embodiment. In another embodiment, the TDM pattern 400 is defined to ensure that a beacon frame is transmitted at some time during the unscheduled period 404, but not necessarily at or near the beginning of the unscheduled period 404. In yet another embodiment, the TDM pattern 400 is defined independently of the beacon interval. In this embodiment, a beacon frame may or may not be transmitted during a particular unscheduled period 404 of the TDM pattern 400.

Although FIGS. 5-8 illustrate several specific example frame exchanges conducted by the network device 300, the specific example are provided only as examples and the techniques described herein are not limited to the example exchanges. For example, the techniques described herein are applicable to other frame exchange scenarios, for example to scenarios in which the frame exchanges include block acknowledgement (block ACK) frames instead of the acknowledgement frame discussed above, scenarios in which scheduled or unscheduled automatic power save delivery (APSD) frames, or scheduled or unscheduled power-save multi-poll (PSMP) frames, are used in place of the PS-Poll frames described above to trigger transmission of downlink data to a client station, in scenarios in which other frame exchanges include other types of frames, such as quality of service (QoS) data frames, null frames, aggregate MAC protocol data units (MPDU) frames, etc.

Figure 9:
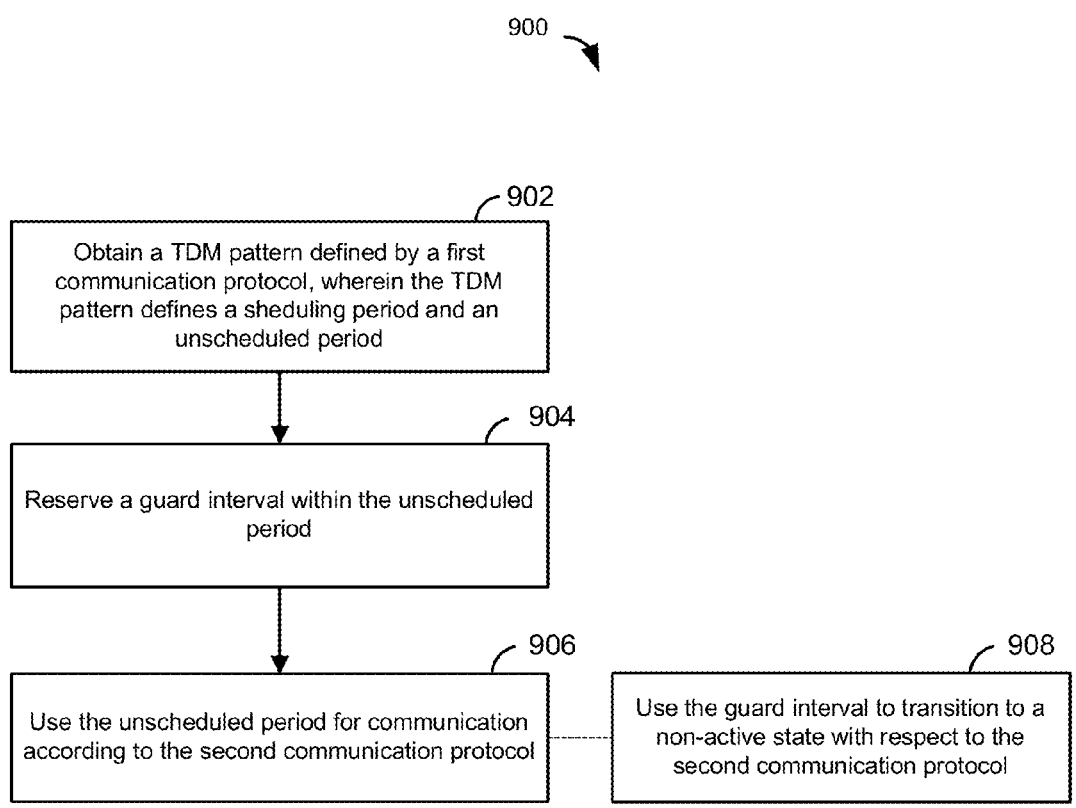
FIG. 9 is a flow diagram of an example method for operating of operating a communication device configured to utilize multiple wireless communication technologies, according to an embodiment.

FIG. 9 is a flow diagram of an example method 900 of operating a device configured to communicate according to a first communication protocol and a second communication protocol, according to an embodiment. With reference to FIG. 3, the method 900 is implemented by the communication device 300, in an embodiment. For example, the method 300 is implemented at least partially by the controller 314 of the network device 300, in an embodiment. In other embodiments, the method 900 is implemented by other suitable communication devices. For ease of explanation, the method 900 is described below as being performed by the communication device 300 of FIG. 3

At block 902, the communication device 300 obtains a TDM pattern. For example, the communication device 300 obtains the TDM pattern 400 of FIG. 4. In another embodiment, the communication device 300 obtains another suitable TDM pattern. The TDM pattern is defined by the first communication protocol (e.g., a 3GPP LTE communication protocol), in an embodiment. As an example, with reference to FIG. 1, in an embodiment in which the communication device 300 is operating in the network 100, the communication device 300 receives the TDM pattern from the base station 110. As another example, with reference to FIG. 2, in an embodiment in which the communication device 300 is operating in the network 200, the communication device 300 receives the TDM pattern from the base station 210. In other embodiments, the communication device 300 obtains the TDM pattern in other suitable manners. The TDM pattern defines a scheduling period and an unscheduled period, in an embodiment.

At block 904, the communication device 300 reserves a guard interval within the unscheduled period defined by the TDM pattern obtained at block 902. In an embodiment, the communication device reserves the guard interval at the end of the unscheduled period. In an embodiment, reserving the guard interval includes determining a duration or a length of the guard interval. The guard interval begins a time during the unscheduled time interval determined based in the duration of the guard interval such that the end of the guard interval aligns with the end of the unscheduled time period, in an embodiment. In an embodiment, the communication device determines the duration of the guard interval based on one or more of (i) data rate being utilized by the communication device 300 and (ii) a mode of operation of the communication device 300 (e.g., based on whether the communicating device is operating as a base station or a client station, based on whether the communication device is operating in uplink mode or in downlink mode, a combination of thereof, etc.). In some embodiments, the communicating device 300 adjusts the duration of the guard interval during the unscheduled period, such as when the data rate being utilized by the communication device 300 changes during the unscheduled period and/or when the mode of operation of the communication device 300 changes (e.g., from uplink to downlink or vise versa) during the unscheduled period. In other embodiments, however, the communicating device 300 does not adjust the duration of the guard interval even if data rate and/or mode of operation change during the unscheduled period.

At block 906, the communication device 300 utilizes the unscheduled period for communication according to the second communication protocol. In an embodiment, the communication device 300 communicates according to the second communication protocol only during the unscheduled period, and operates according to the first communication protocol only during the scheduling period, thereby avoiding in-device coexistence interference between operation according to the two communication protocols, in an embodiment. With reference to FIG. 3, at block 906, the communication device 300 activates the second network interface 308 at the beginning of the unscheduled period and deactivates the second network interface 308 at the end of the unscheduled interval, in an embodiment.

According to an embodiment, block 906 includes block 908. At block 908, the communication device 300 utilizes the guard interval reserved at block 904 to transition to an inactive state with respect to the second communication protocol. For example, the communication device 300 completes a current frame exchange (if a current frame exchange is in progress) and informs, other devices that operate at least according to the second communication protocol that the other devices should hold off further transmissions (e.g., suspend transmission), at least until the next unscheduled period of the TDM pattern obtained at block 902, in some embodiments and/or scenarios. Additionally or alternatively, after completion of a current frame exchange (if a current frame exchange is in progress), the communication device 300 informs the MAC processing unit 310 that the MAC processing unit 310 should hold off transmission until the next unscheduled period, in some embodiments and/or scenarios.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method of operating a communication device configured to communicate according to at least a first communication protocol and a second communication protocol, the method comprising:

obtaining, at the communication device, a time division multiplexing (TDM) pattern defined for communication in a first network according to the first communication protocol, wherein the TDM pattern defines communication periodicity that includes a scheduled period and an unscheduled period of the first network;

reserving, by the communication device, a guard interval within the unscheduled period, the guard interval for completing frame exchanges, in a second network according to the second communication protocol, so that no frame exchanges with the communication device in the second network occur during a next scheduled period in the TDM pattern;

using, at the communication device, the unscheduled period for communication in the second network according to the second communication protocol, including using the guard interval to complete one or more frame exchanges in the second network prior to the next scheduled period in the TDM pattern of the first network; and transmitting, by the communication device, a management frame during the guard interval, wherein:

the management frame is configured to cause one or more other devices operating in the second network according to the second communication protocol to refrain from transmitting until a next unscheduled period in the TDM pattern, and the management frame includes an indication of a time duration for which the one or more other devices are to refrain from transmitting, the time duration corresponding to a mathematical sum of (i) a remaining time duration of a current unscheduled period at a time of transmission of the management frame and (ii) a duration of the scheduled period.

2. The method of claim 1, wherein reserving the guard interval includes determining a duration of the guard interval.

3. The method of claim 2, wherein determining the duration of the guard interval comprises determining the duration based on one or more of (i) a data rate of communications between the communication device and at least one other communication device in the second network, (ii) whether the communication device in the second network is acting as an access point device or a client station, and (iii) whether communications in the second network during the guard interval are uplink communications or downlink communications.

4. The method of claim 1, wherein the management frame is a clear to send to self (CTS-to-Self) frame.

5. The method of claim 1, wherein using the guard interval to transition to the inactive state further comprises, prior to transmitting the management frame, determining whether a frame exchange is in progress, and
in response to determining that a frame exchange is in progress, completing the frame exchange before transmitting the management frame.

6. A method of operating a communication device configured to communicate according to at least a first communication protocol and a second communication protocol, the method comprising:
obtaining, at the communication device, a time division multiplexing (TDM) pattern defined for communication in a first network according to the first communication protocol, wherein the TDM pattern defines communication periodicity that includes a scheduled period and an unscheduled period of the first network;
reserving, by the communication device, a guard interval within the unscheduled period, the guard interval for completing frame exchanges, in a second network according to the second communication protocol, so that no frame exchanges with the communication device in the second network occur during a next scheduled period in the TDM pattern;
using, at the communication device, the unscheduled period for communication in the second network according to the second communication protocol;
using, at the communication device, the guard interval to selectively complete one frame exchange in the second network prior to the next scheduled period in the TDM pattern of the first network, including, in response to determining that the guard interval has started:
monitoring a communication medium for a time of predetermined duration to determine whether the communication medium is available,
in response to determining that the communication medium is available, initiating a frame exchange, and
in response to determining that the communication medium is not available, holding off initiation of the frame exchange for a duration of time that is at least a mathematical sum of (i) a remaining time duration of a current unscheduled period and (ii) a duration of the scheduled period.

7. An apparatus, comprising
a communication device having a first network interface configured to operate according to a first communication protocol and a second network interface configured to operate according to a second communication protocol, the communication device configured to:
obtain a time division multiplexing (TDM) pattern defined for communication in a first network according to the first communication protocol, wherein the TDM pattern defines communication periodicity that includes a scheduled period and an unscheduled period of the first network;
reserve a guard interval within the unscheduled period, the guard interval for completing frame exchanges, in a second network according to the second communication protocol, so that no frame exchanges with the communication device in the second network occur during a next scheduled period in the TDM pattern;
operate the second network interface during the unscheduled period for communication in the second network according to the second communication protocol;
utilize the guard interval to complete one or more frame exchanges in the second network prior to the next scheduled period in the TDM pattern of the first network; and
transmit a management frame during the guard interval, wherein:
the management frame is configured to cause one or more other devices operating in the second network according to the second communication protocol to refrain from transmitting until a next unscheduled period in the TDM pattern, and
the management frame includes an indication of a time duration for which the one or more other devices are to refrain from transmitting, the time duration corresponding to a mathematical sum of (i) a remaining time duration of a current unscheduled period at a time of transmission of the management frame and (ii) a duration of the scheduled period.

8. The apparatus of claim 7, wherein the communication device is further configured to determine a duration of the guard interval.

9. The apparatus of claim 8, wherein the communication device is configured to determine the duration of the guard interval based on one or more of (i) a data rate of communications between the communication device and at least one other communication device in the second network, (ii) whether the communication device in the second network is acting as an access point device or a client station, and (iii) whether communications in the second network during the guard interval are uplink communications or downlink communications.

10. The apparatus of claim 7, wherein the management frame is a clear to send to self (CTS-to-Self) frame.

11. The apparatus of claim 7, wherein the communication device is further configured to, prior to transmitting the management frame, determine whether a frame exchange is in progress, and
in response to determining that a frame exchange is in progress, wait until the frame exchange is completed before transmitting the management frame.

12. An apparatus, comprising:
a communication device having a first network interface configured to operate according to a first communication protocol and a second network interface configured to operate according to a second communication protocol, the communication device configured to:
obtain a time division multiplexing (TDM) pattern defined for communication in a first network according to the first communication protocol, wherein the TDM pattern defines communication periodicity that includes a scheduled period and an unscheduled period of the first network;

reserve a guard interval within the unscheduled period, the guard interval for completing frame exchanges, in a second network according to the second communication protocol, so that no frame exchanges with the communication device in the second network occur during a next scheduled period in the TDM pattern;

operate the second network interface during the unscheduled period for communication in the second network according to the second communication protocol;

utilize the guard interval to selectively complete one frame exchange in the second network prior to the next scheduled period in the TDM pattern of the first network, including, in response to determining that the guard interval has started:
  monitor a communication medium for a time of predetermined duration to determine whether the communication medium is available,
  in response to determining that the communication medium is available, initiate a frame exchange, and
  in response to determining that the communication medium is not available, hold off initiation of the frame exchange for a duration of time that is at least a mathematical sum of (i) a remaining time duration of a current unscheduled period and (ii) a duration of the scheduled period.

* * * * *